United States Patent
Kareff et al.

(10) Patent No.: US 10,443,408 B2
(45) Date of Patent: Oct. 15, 2019

(54) DAMPER PIN FOR A TURBINE BLADE

(71) Applicant: General Electric Company, Schenectady, NY (US)

(72) Inventors: Spencer A. Kareff, Simpsonville, SC (US); Brian Denver Potter, Greer, SC (US); Ariel Caesar Prepena Jacala, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 1034 days.

(21) Appl. No.: 14/844,545

(22) Filed: Sep. 3, 2015

(65) Prior Publication Data
US 2017/0067350 A1    Mar. 9, 2017

(51) Int. Cl.
*F01D 5/22* (2006.01)

(52) U.S. Cl.
CPC ............. *F01D 5/22* (2013.01); *F05D 2220/32* (2013.01); *F05D 2250/141* (2013.01); *Y02T 50/672* (2013.01)

(58) Field of Classification Search
CPC .. F01D 5/22; F05D 2220/32; F05D 2250/141; Y02T 50/672
USPC .................................................. 416/145, 190
See application file for complete search history.

(56) References Cited

U.S. PATENT DOCUMENTS

| 3,266,770 A | 8/1966 | Harlow |
|---|---|---|
| 3,881,844 A | 5/1975 | Hennessey et al. |
| 4,872,812 A | 10/1989 | Hendley et al. |
| 4,936,749 A | 6/1990 | Arrao et al. |
| 5,226,784 A | 7/1993 | Mueller et al. |
| 5,478,207 A | 12/1995 | Stec |
| 5,827,047 A | 10/1998 | Gonsor et al. |
| 6,171,058 B1 | 1/2001 | Stec |
| 6,354,803 B1 | 3/2002 | Grover et al. |
| 6,450,769 B2 | 9/2002 | Szwedowicz |
| 6,478,544 B2 | 11/2002 | Brandl et al. |

(Continued)

FOREIGN PATENT DOCUMENTS

| EP | 2 472 065 A1 | 7/2012 |
|---|---|---|
| EP | 2 738 353 A2 | 6/2014 |

(Continued)

OTHER PUBLICATIONS

Co-Pending U.S. Appl. No. 14/844,280, filed Sep. 3, 2015.

(Continued)

*Primary Examiner* — Mark A Laurenzi
*Assistant Examiner* — Paul W Thiede
(74) *Attorney, Agent, or Firm* — Dority & Manning, P.A.

(57) ABSTRACT

A damper pin for damping adjacent turbine blades coupled to a rotor shaft includes a first end portion that is axially aligned with and axially spaced from a second end portion and a retention pin that is coaxially aligned with and disposed between the first end portion and the second end portion. The retention pin couples the first end portion to the second end portion. The damper pin further includes a plurality of rings coaxially aligned with and disposed along the retention pin between the first end portion and the second end portion. The first end portion, the second end portion and the plurality of rings define a generally arcuate outer surface of the damper pin that is configured to contact with a groove defined between the adjacent turbine blades.

13 Claims, 3 Drawing Sheets

(56) References Cited

U.S. PATENT DOCUMENTS

| | | | |
|---|---|---|---|
| 6,659,725 | B2 | 12/2003 | Yeo et al. |
| 6,776,583 | B1 | 8/2004 | Wang et al. |
| 6,851,932 | B2 | 2/2005 | Lagrange et al. |
| 7,163,376 | B2 | 1/2007 | Itzel et al. |
| 7,534,090 | B2 | 5/2009 | Good et al. |
| 7,731,482 | B2 | 6/2010 | Lagrange et al. |
| 2006/0257262 | A1 | 11/2006 | Itzel et al. |
| 2013/0276456 | A1 | 10/2013 | Propheter-Hinckley et al. |
| 2014/0079529 | A1 | 3/2014 | Kareff et al. |
| 2014/0112792 | A1 | 4/2014 | Thomen et al. |
| 2014/0147276 | A1* | 5/2014 | Roberts, III .......... F01D 5/3084 416/135 |

FOREIGN PATENT DOCUMENTS

| | | |
|---|---|---|
| EP | 3 043 085 A1 | 7/2016 |
| EP | 3 070 274 A1 | 9/2016 |
| EP | 3 078 808 A1 | 10/2016 |
| EP | 3 093 439 A1 | 11/2016 |

OTHER PUBLICATIONS

Co-Pending U.S. Appl. No. 14/844,294, filed Sep. 3, 2015.
Co-Pending U.S. Appl. No. 14/844,306, filed Sep. 3, 2015.
Co-Pending U.S. Appl. No. 14/844,317, filed Sep. 3, 2015.
Co-Pending U.S. Appl. No. 14/844,392, filed Sep. 3, 2015.
Co-Pending U.S. Appl. No. 14/988,070, filed Jan. 5, 2016.
U.S. Appl. No. 14/844,280, filed Sep. 3, 2015, Kareff, et al.
U.S. Appl. No. 14/844,294, filed Sep. 3, 2015, Kareff, et al.
U.S. Appl. No. 14/844,306, filed Sep. 3, 2015, Kareff, et al.
U.S. Appl. No. 14/844,317, filed Sep. 3, 2015, Kareff, et al.
U.S. Appl. No. 14/844,392, filed Sep. 3, 2015, Kareff, et al.
U.S. Appl. No. 14/988,070, filed Jan. 5, 2016, Kareff, et al.
Extended European Search Report and Opinion issued in connection with corresponding EP Application No. 16185251.2 dated Jan. 31, 2017.
Extended European Search Report and Opinion issued in connection with related EP Application No. 16183857.8 dated Feb. 3, 2017.
Extended European Search Report and Opinion issued in connection with related EP Application No. 16186535.7 dated Feb. 3, 2017.
Extended European Search Report and Opinion issued in connection with related EP Application No. 16183856.0 dated Feb. 3, 2017.
Extended European Search Report and Opinion issued in connection with related EP Application No. 16184881.7 dated Feb. 3, 2017.
Extended European Search Report and Opinion issued in connection with related EP Application No. 16185255.3 dated Feb. 3, 2017.
Non-Final Rejection towards related U.S. Appl. No. 14/844,294 dated Mar. 23, 2017.
Final Rejection towards related U.S. Appl. No. 14/844,294 dated Jul. 24, 2017.

\* cited by examiner

DAMPER PIN FOR A TURBINE BLADE

FIELD OF THE INVENTION

The present invention generally relates to a turbomachine having multiple circumferentially aligned turbine blades. More particularly, this invention involves a damper pin having a plurality of rings for providing vibration damping between adjacent turbine blades.

BACKGROUND OF THE INVENTION

A turbine blade, also known as a turbine bucket or turbine rotor blade, converts energy from a flowing fluid such as hot combustion gas or steam into mechanical energy by causing a rotor shaft of a turbomachine to rotate. As the turbomachine transitions through various operating modes, the turbine blades are subjected to both mechanical and thermal stresses.

A turbine blade generally includes an airfoil that extends radially outwardly from a platform, a shank that extends radially inwardly from the platform and a dovetail or mounting portion that extends radially inwardly from the shank. The dovetail of each turbine blade is secured within a complementary slot defined in a rotor wheel or disk. The rotor wheel is coupled to the rotor shaft.

During engine operation, vibrations may be introduced into the turbine blades. For example, fluctuations in flow of the hot combustion gases or steam may cause them to vibrate. One basic design consideration for turbomachine designers is to avoid or to minimize resonance with natural frequencies of the turbine blades and the dynamic stresses produced by forced response and/or aero-elastic instabilities, thus controlling high cycle fatigue of the turbine blades. In order to improve the high cycle fatigue life of a turbine blade, vibration dampers are typically provided below and/or between the platforms to frictionally dissipate vibratory energy and reduce the corresponding amplitude of vibration during operation. The amount of vibrational energy that is removed by the vibration damper is a function of the dynamic weight of the vibration damper and the reaction loads.

Although known dampers may be largely adequate during typical operations, there is a desire to improve overall damper effectiveness. Prior attempts to accomplish damping of vibrations have included round damper pins, sheet metal flat dampers, or complex wedge shaped dampers. Often true damper performance of these types of dampers is not known until the first engine test. However, at that time, the damper pocket geometry in the turbine blades is locked in by hard tooling. Thus, if the damper does not perform as expected, then a potentially expensive tooling rework may be required. Accordingly, there is desire for a damping pin that provides a natural frequency tuning tool for resonant mode excitation avoidance and that enables independent mode tuning options without necessitating changes to the design of an existing turbine blade.

BRIEF DESCRIPTION OF THE INVENTION

Aspects and advantages of the invention are set forth below in the following description, or may be obvious from the description, or may be learned through practice of the invention.

One embodiment of the present invention is a damper pin for damping adjacent turbine blades coupled to a rotor shaft. The damper pin includes a first end portion that is axially aligned with and axially spaced from a second end portion and a retention pin that is coaxially aligned with and disposed between the first end portion and the second end portion. The retention pin couples the first end portion to the second end portion. The damper pin further includes a plurality of rings coaxially aligned with and disposed along the retention pin between the first end portion and the second end portion. The first end portion, the second end portion and the plurality of rings define a generally arcuate outer surface of the damper pin that is configured to contact with a groove defined between the adjacent turbine blades.

Another embodiment of the present invention is a turbine engine. The turbine engine includes a rotor shaft that extends axially within the turbine engine and an adjacent pair of turbine blades that are coupled to the rotor shaft. Each turbine blade at least partially defines a groove that extends along a slash face of the corresponding turbine blade. The turbine engine further includes a damper pin that is disposed within the groove between the adjacent turbine blades. The damper pin includes a first end portion that is axially aligned with and axially spaced from a second end portion and a retention pin that is coaxially aligned with and disposed between the first end portion and the second end portion. The retention pin couples the first end portion to the second end portion. The damper pin further includes a plurality of rings coaxially aligned with and disposed along the retention pin between the first end portion and the second end portion. The first end portion, the second end portion and the plurality of rings define a generally arcuate outer surface of the damper pin that is configured to contact with the groove defined between the adjacent turbine blades.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
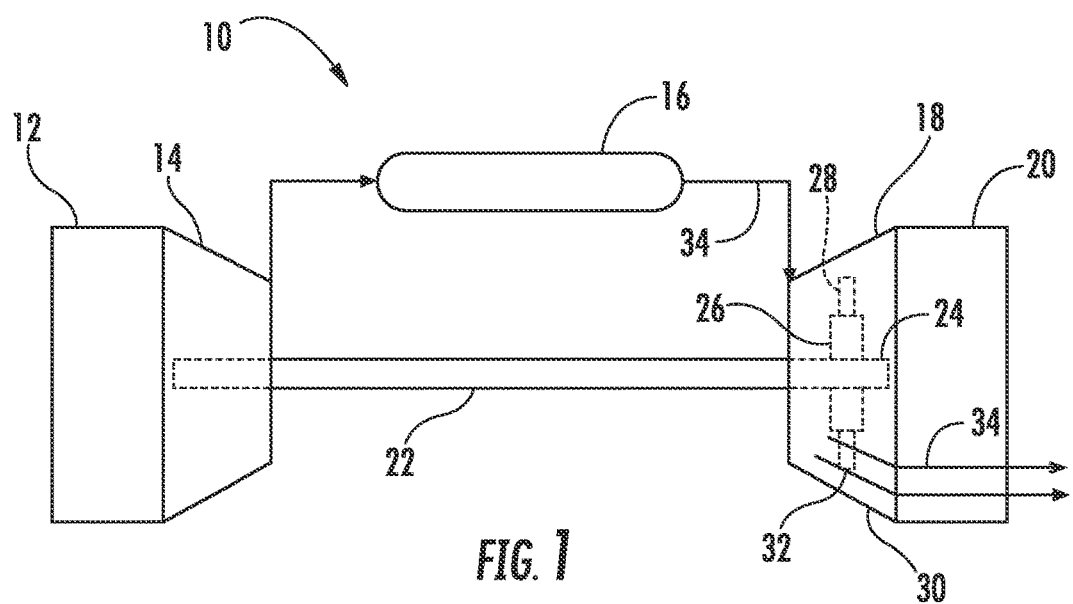
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbomachine including but not limited to a steam turbine, an aircraft gas turbine or marine gas turbine.

Referring now to the drawings, FIG. 1 illustrates a schematic diagram of one embodiment of a gas turbine 10. The gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotor blades 28 extending radially outwardly from and being interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
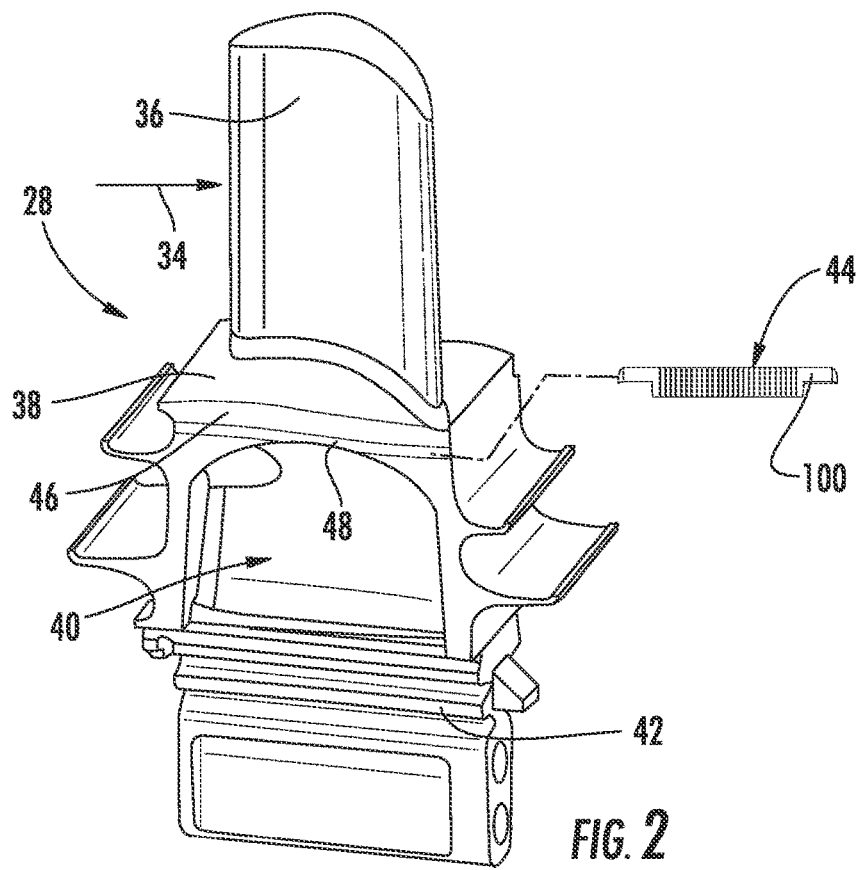
FIG. 2 is a perspective view of an exemplary turbine blade according to at least one embodiment of the present invention.
Figure 3:
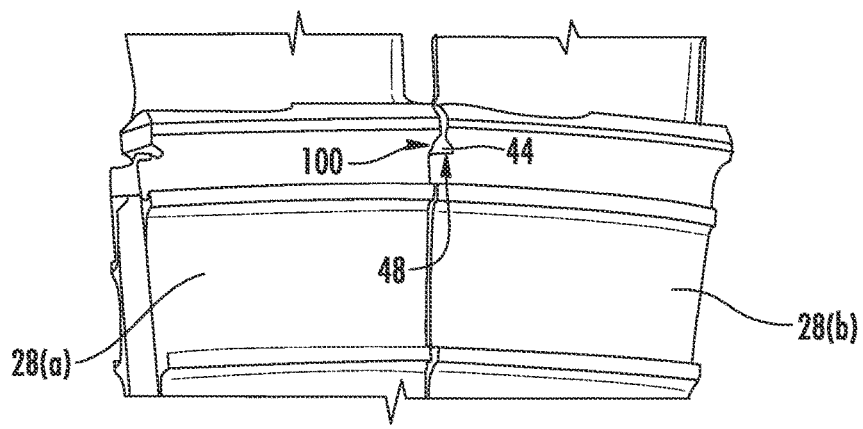
FIG. 3 is a schematic illustration of a damper pin disposed between circumferentially adjacent turbine blades according to at least one embodiment of the present invention.

FIG. 2 illustrates a conventional turbine blade or bucket 28 including an airfoil 36, a platform 38, a shank 40 and a dovetail or mounting portion 42. FIG. 3 provides a downstream view of a pair of circumferentially adjacent turbine blades 28(a), 28(b). As shown in FIG. 2, the dovetail 42 is utilized to secure the turbine blade 28 to a periphery of the rotor disk 26 (FIG. 1), as is well understood in the art. The platform 38 defines an inward flow boundary for the combustion gases 34 flowing through the hot gas path 32 of the turbine section 18 (FIG. 1). In various embodiments of the present invention, a damper pin 44 is located along one axial edge (or slash face) 46 adjacent to (i.e., radially inward of) the turbine blade platform 38. It will be appreciated that a similar damper pin 44 is located between each adjacent pair of turbine blades 28(a), 28(b) (FIG. 3) on the rotor disk 26 (FIG. 1) as apparent from FIG. 3. In particular embodiments, as shown in FIG. 2, the damper pin 44 is located in an elongated groove 48 (FIG. 1) that extends along the entire slash face 46 of the turbine blade 28.

The damper pin 44 serves as a vibration damper. When installed, as shown in FIG. 3, the damper pin 44 is positioned between the adjacent turbine blades 28(a), 28(b). In operation, the damper pin 44 frictionally dissipates vibratory energy and reduces corresponding amplitude of vibration. The amount of vibrational energy that is removed by the damper pin 44 is a function several factors including but not limited to the dynamic weight of the damper pin 44, the geometry of the damper pin 44 and the reaction loads between the adjacent turbine blades 28(a), 28(b).

Figure 4:
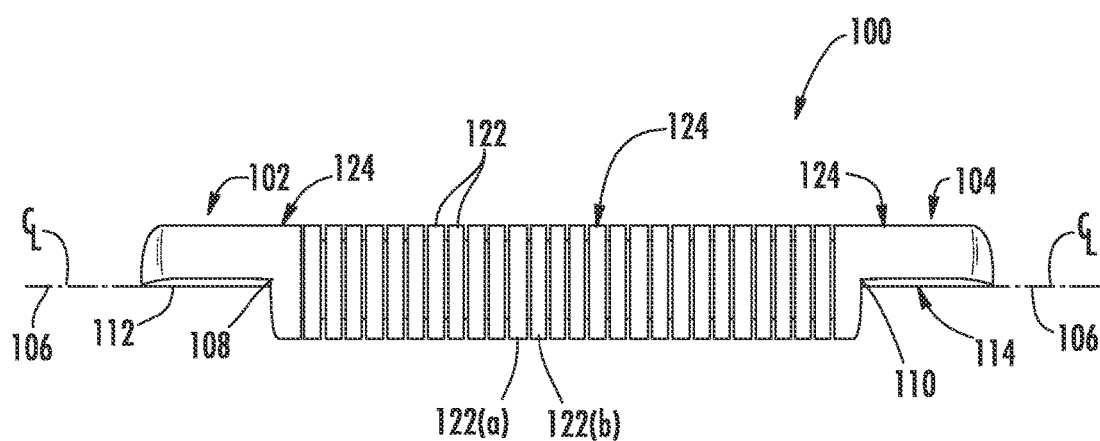
FIG. 4 is a side view of an exemplary damper pin according to one embodiment of the present invention.
Figure 5:
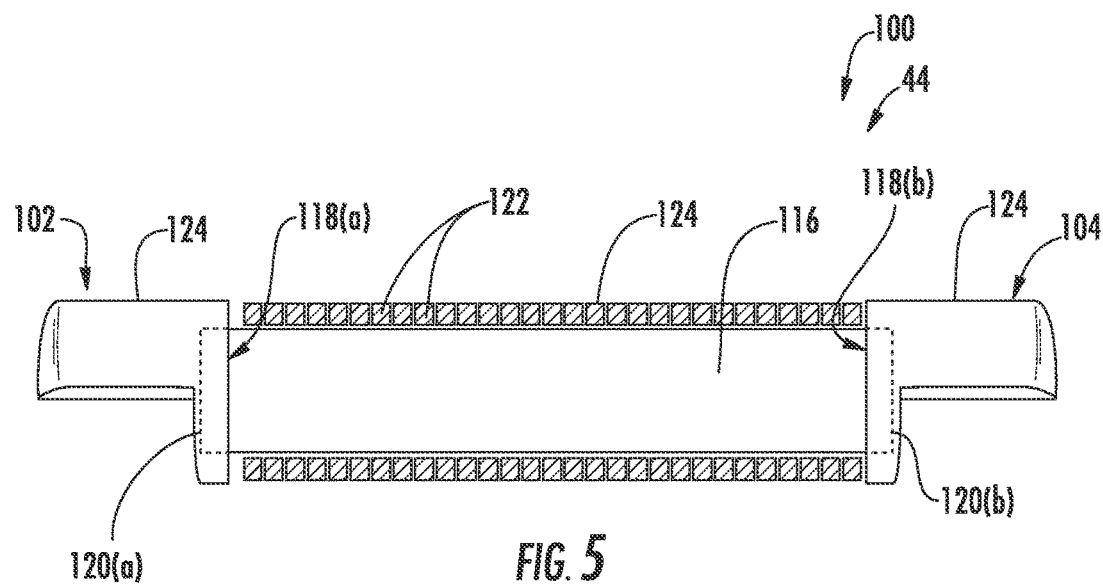
FIG. 5 is a partially cross sectioned side view of the exemplary damper pin as shown in FIG. 4, according to one embodiment of the present invention.
Figure 6:
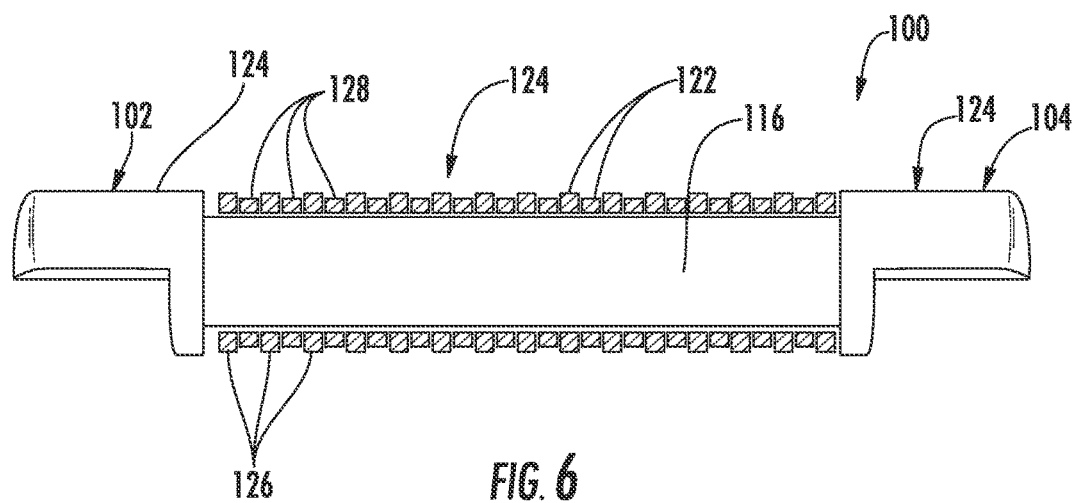
FIG. 6 is a partially cross sectioned side view of the exemplary damper pin as shown in FIG. 4, according to one embodiment of the present invention.

FIG. 4 provides a side view of an exemplary damper pin 100 according to one embodiment of the present invention. FIG. 5 provides a partially cross sectioned side view of the damper pin 100 as shown in FIG. 4. FIG. 6 provides a partially cross sectioned side view of the damper pin 100 according to one embodiment of the present invention. It is to be understood that damper pin 100 shown in FIG. 4 may be substituted for damper pin 44 as shown in FIGS. 2 and 3.

In one embodiment, as shown collectively in FIGS. 4, 5 and 6, the damper pin 100 includes a first end portion 102 axially spaced from a second end portion 104 with respect to an axial centerline 106 of the damper pin 100. In particular embodiments, the first end portion 102 and the second end portion 104 may be coaxially aligned with respect to centerline 106.

In particular embodiments, as shown in FIGS. 4-6, the first end portion 102 and/or the second end portion 104 of the damper pin 100 may be substantially semi-cylindrical. As shown in FIG. 4, the first end portion 102 and/or the second end portion 104 may include shoulders 108, 110 respectfully. This configuration creates flat support surfaces 112, 114 that are adapted to rest on machined turbine blade platform surfaces or shoulders at opposite ends of the groove 48 formed in the turbine blade slash face 46, thereby providing support for the damper pin 100 while preventing undesirable excessive rotation during machine operation.

As shown in FIGS. 5 and 6, the damper pin 100 further includes a retention pin 116. The retention pin 116 couples the first end portion 102 to the second end portion 104. The retention pin 116 may be coaxially aligned with and disposed between the first end portion 102 and the second end portion 104. In particular embodiments, as shown in FIG. 5, one or both end portions 118(a), 118(b) of the retention pin

108 may be seated within openings 120(*a*), 120(*b*) defined by the first end portion 102 and the second end portion 104 respectfully. For example, in one embodiment, end 118(*a*) is seated within openings 120(*a*) while the other end 118(*b*) is fixedly connected to the second end portion 104. In another embodiment, end 118(*b*) is seated within openings 120(*b*) while the other end 118(*a*) is fixedly connected to the first end portion 102. In either of these configurations, the retention pin 108 may be separated from either the first or second end portions 102, 104. In the alternative, as shown in FIG. 6, both ends 118(*a*), 118(*b*) of the retention pin 108 may be fixedly connected to the first end portion 102 and the second end portion 104.

In various embodiments, as shown collectively in FIGS. 4-6, the damper pin 100 includes a plurality of rings 122 that at least partially circumferentially surround the retention pin 108. The rings 122 may be coaxially aligned with and disposed along the retention pin 108 between the first end portion 102 and the second end portion 104. The first end portion 102, the second end portion 104 and the plurality of rings 122 define a generally arcuate outer surface 124 of the damper pin 100. At least a portion of the outer surface 124 is configured (shaped and/or sized) to contact with an inner surface of the groove 48 defined between the adjacent turbine blades 28(*a*), 28(*b*). In one embodiment, at least a portion of the top portion 124 may be coated with a low-friction wear-resistant coating. The shape, size, and material of the rings 122 may be chosen based on analytical results or by test results. The rings 122 provide an ability to tune stiffness in a specific direction while maintaining stiffness in alternative directions.

In one embodiment, as shown in FIG. 4, the plurality of rings 122 may comprise of two or more rings 122(*a*) and 122(*b*) formed from different materials. For example, ring 122(*a*) may be formed from a metallic material while 122(*b*) may be formed from a metallic material or a composite material or other material having different damping or mechanical properties from ring 122(*a*). Rings 122(*a*) and 122(*b*) may be placed axially adjacent or may be axially spaced from each other along the retention pin 108.

In one embodiment, as shown in FIG. 6, the plurality of rings 122 may comprise a first set of rings 126 and a second set of rings 128. Each ring 126 of the first set of rings 126 has a diameter that is substantially equal to a diameter of the first and second end portions 102, 104. Each ring 128 of the second set of rings 128 has a diameter that is less than the diameter of the first and second end portions 102, 104 and/or the rings 126 of the first set of rings 126.

The damper pin 100 illustrated in FIGS. 4-6 and described herein, provides various technological benefits over existing damper pins. For example, the rings provide a natural frequency tuning tool for avoiding resonant mode excitation of the turbine blades and may enable independent mode tuning options without requiring modifications to the turbine blade itself.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A damper pin for damping adjacent turbine blades coupled to a rotor shaft, the damper pin comprising:
    a first end portion axially aligned with and axially spaced from a second end portion;
    a retention pin coaxially aligned with and disposed between the first end portion and the second end portion, wherein the retention pin couples the first end portion to the second end portion; and
    a plurality of rings coaxially aligned with and disposed along the retention pin between the first end portion and the second end portion, wherein the first end portion, the second end portion and the plurality of rings define a generally arcuate outer surface of the damper pin that is configured to contact with a groove defined between the adjacent turbine blades, wherein the plurality of rings comprises two or more rings formed from different materials.

2. The damper pin as in claim 1, wherein each ring of the plurality of rings extends circumferentially around the retention pin.

3. The damper pin as in claim 1, wherein at least one of the first end portion or the second end portion of the elongated outer body is semi-cylindrical.

4. The damper pin as in claim 1, further comprising a low-friction wear-resistant coating applied to at least a portion of the outer surface of the damper pin.

5. A damper pin for damping adjacent turbine blades coupled to a rotor shaft, the damper pin comprising:
    a first end portion axially aligned with and axially spaced from a second end portion;
    a retention pin coaxially aligned with and disposed between the first end portion and the second end portion, wherein the retention pin couples the first end portion to the second end portion; and
    a plurality of rings coaxially aligned with and disposed along the retention pin between the first end portion and the second end portion, wherein the first end portion, the second end portion and the plurality of rings define a generally arcuate outer surface of the damper pin that is configured to contact with a groove defined between the adjacent turbine blades, wherein the plurality of rings comprise a first set of rings and a second set of rings, each ring of the first set of rings having a diameter substantially equal to a diameter of the first and second end portions, each ring of the second set of rings having a diameter that is less than the diameter of the first and second end portions.

6. A damper pin for damping adjacent turbine blades coupled to a rotor shaft, the damper pin comprising:
    a first end portion axially aligned with and axially spaced from a second end portion;
    a retention pin coaxially aligned with and disposed between the first end portion and the second end portion, wherein the retention pin couples the first end portion to the second end portion; and
    a plurality of rings coaxially aligned with and disposed along the retention pin between the first end portion and the second end portion, wherein the first end portion, the second end portion and the plurality of rings define a generally arcuate outer surface of the damper pin that is configured to contact with a groove defined between the adjacent turbine blades, wherein the retention pin is seated within an opening defined by the first end portion.

7. A turbine engine, comprising:
    a rotor shaft that extends axially within the turbine engine;

an adjacent pair of turbine blades coupled to the rotor shaft, each turbine blade at least partially defining a groove that extends along a slash face of the corresponding turbine blade; and a damper pin disposed within the groove, the damper pin comprising:

a first end portion axially aligned with and axially spaced from a second end portion;

a retention pin coaxially aligned with and disposed between the first end portion and the second end portion, wherein the retention pin couples the first end portion to the second end portion; and a plurality of rings coaxially aligned with and disposed along the retention pin between the first end portion and the second end portion, wherein the first end portion, the second end portion and the plurality of rings define a generally arcuate outer surface of the damper pin that is configured to contact with the groove defined between the adjacent turbine blades, wherein each ring of the plurality of rings extends circumferentially around the retention pin, and wherein the plurality of rings comprises two or more rings formed from different materials.

8. The turbine engine as in claim 7, wherein at least one of the first end portion or the second end portion of the elongated outer body is semi-cylindrical.

9. The turbine engine as in claim 7, wherein the turbine engine is a gas turbine engine.

10. A turbine engine, comprising:

a rotor shaft that extends axially within the turbine engine;

an adjacent pair of turbine blades coupled to the rotor shaft, each turbine blade at least partially defining a groove that extends along a slash face of the corresponding turbine blade; and a damper pin disposed within the groove, the damper pin comprising:

a first end portion axially aligned with and axially spaced from a second end portion;

a retention pin coaxially aligned with and disposed between the first end portion and the second end portion, wherein the retention pin couples the first end portion to the second end portion; and a plurality of rings coaxially aligned with and disposed along the retention pin between the first end portion and the second end portion, wherein the first end portion, the second end portion and the plurality of rings define a generally arcuate outer surface of the damper pin that is configured to contact with the groove defined between the adjacent turbine blades, wherein the plurality of rings comprise a first set of rings and a second set of rings, each ring of the first set of rings having a diameter substantially equal to a diameter of the first and second end portions, each ring of the second set of rings having a diameter that is less than the diameter of the first and second end portions.

11. A turbine engine, comprising:

a rotor shaft that extends axially within the turbine engine;

an adjacent pair of turbine blades coupled to the rotor shaft, each turbine blade at least partially defining a groove that extends along a slash face of the corresponding turbine blade; and a damper pin disposed within the groove, the damper pin comprising:

a first end portion axially aligned with and axially spaced from a second end portion;

a retention pin coaxially aligned with and disposed between the first end portion and the second end portion, wherein the retention pin couples the first end portion to the second end portion; and a plurality of rings coaxially aligned with and disposed along the retention pin between the first end portion and the second end portion, wherein the first end portion, the second end portion and the plurality of rings define a generally arcuate outer surface of the damper pin that is configured to contact with the s-groove defined between the adjacent turbine blades, wherein the retention pin is seated within an opening defined by the second end portion.

12. A turbine engine, comprising:

a rotor shaft that extends axially within the turbine engine;

an adjacent pair of turbine blades coupled to the rotor shaft, each turbine blade at least partially defining a groove that extends along a slash face of the corresponding turbine blade; and a damper pin disposed within the groove, the damper pin comprising:

a first end portion axially aligned with and axially spaced from a second end portion;

a retention pin coaxially aligned with and disposed between the first end portion and the second end portion, wherein the retention pin couples the first end portion to the second end portion; and a plurality of rings coaxially aligned with and disposed along the retention pin between the first end portion and the second end portion, wherein the first end portion, the second end portion and the plurality of rings define a generally arcuate outer surface of the damper pin that is configured to contact with a groove defined between the adjacent turbine blades, further comprising a low-friction wear-resistant coating applied to at least a portion of the outer surface of the damper pin, wherein the low-friction wear-resistant coating is applied to the first end portion and the second end portion.

13. A turbine engine, comprising:

a rotor shaft that extends axially within the turbine engine;

an adjacent pair of turbine blades coupled to the rotor shaft, each turbine blade at least partially defining a groove that extends along a slash face of the corresponding turbine blade; and a damper pin disposed within the groove, the damper pin comprising:

a first end portion axially aligned with and axially spaced from a second end portion;

a retention pin coaxially aligned with and disposed between the first end portion and the second end portion, wherein the retention pin couples the first end portion to the second end portion; and a plurality of rings coaxially aligned with and disposed along the retention pin between the first end portion and the second end portion, wherein the first end portion, the second end portion and the plurality of rings define a generally arcuate outer surface of the damper pin that is configured to contact with the groove defined between the adjacent turbine blades, further comprising a low-friction wear-resistant coating applied to at least a portion of the outer surface of the damper pin, wherein the low-friction wear-resistant coating is applied to one or more of the rings.

* * * * *